Dec. 12, 1944.     J. GERALDS     2,364,705
BASKET STRUCTURE
Filed June 22, 1942     3 Sheets-Sheet 1
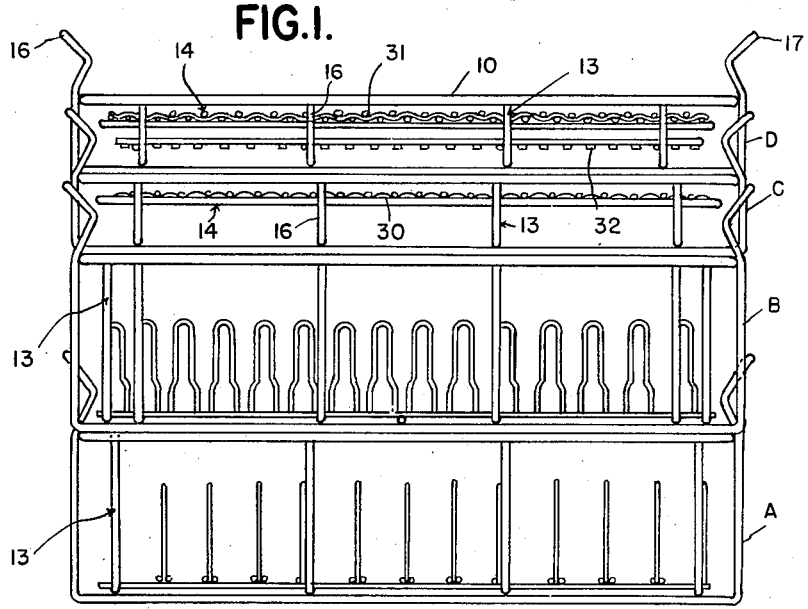
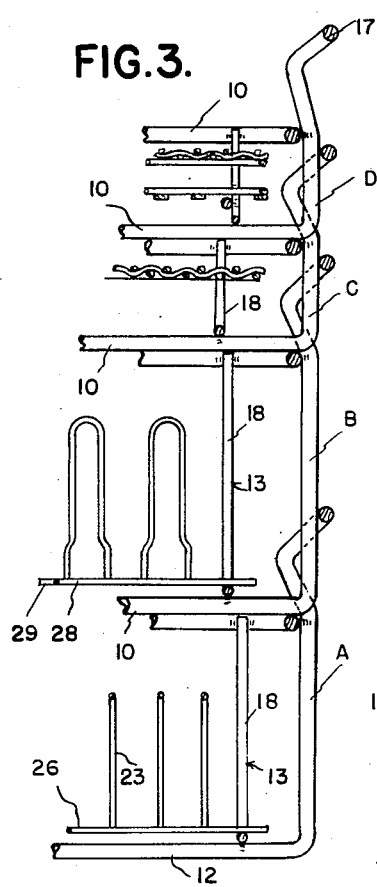
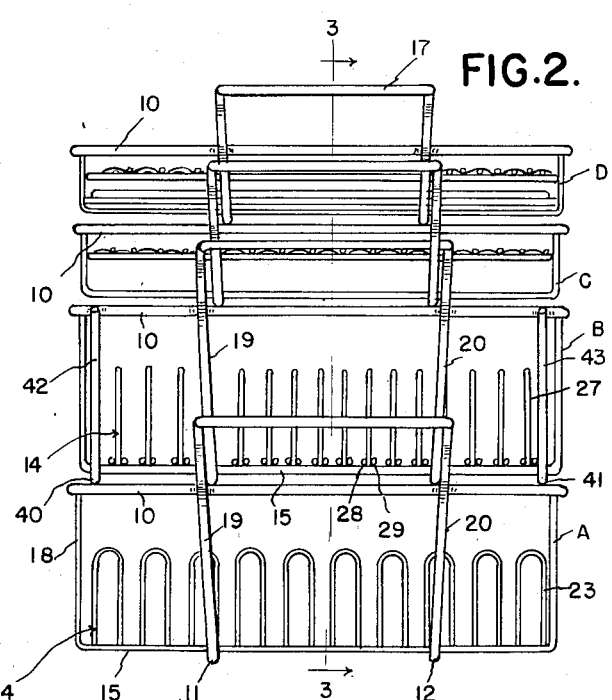
INVENTOR.
JERRY GERALDS
BY
*Whittemore, Hulbert & Belknap*
ATTORNEYS Dec. 12, 1944.   J. GERALDS   2,364,705
BASKET STRUCTURE
Filed June 22, 1942   3 Sheets-Sheet 2

INVENTOR.
JERRY GERALDS
BY
*Whitman, Hulbert & Belknap*
ATTORNEYS

Dec. 12, 1944. J. GERALDS 2,364,705
BASKET STRUCTURE
Filed June 22, 1942 3 Sheets-Sheet 3

INVENTOR.
JERRY GERALDS
BY
*Whittemore Hulbert & Belknap*
ATTORNEYS

Patented Dec. 12, 1944

2,364,705

UNITED STATES PATENT OFFICE 2,364,705

BASKET STRUCTURE

Jerry Geralds, Detroit, Mich., assignor to Mid-West Wire Products Company, Inc., Detroit, Mich., a corporation of Michigan Application June 22, 1942, Serial No. 448,017

12 Claims. (Cl. 220—97)

This invention relates generally to basket structures and refers more particularly to wire basket assemblies.

Heretofore, sheet metal or pressed metal trays or the like, commonly referred to in the trade as shop pans, had been used in shops and factories for carrying in loose or bulk formation from various machines to final inspection machine parts or other articles being manufactured. However such shop pans are objectionable and have proven unsatisfactory. For example, shop pans of the type mentioned are heavy and difficult to handle, especially when loaded. They collect grease and dirt and require frequent cleaning. Moreover, they cannot be stacked satisfactorily and ordinarily provide no means for supporting individually the machine parts or other articles carried thereby. As a result, the machine parts are usually just thrown into the shop pans and frequently are marred or damaged through contact with each other or with the shop pans themselves. Furthermore, the machine parts cannot be cleaned properly in the shop pans during the customary degreasing and washing operations and have to be removed or transferred to other equipment during such operations. Consequently, the machine parts not only require additional handling but also require other means to carry them during or after the cleaning operations mentioned.

In the present instance, the difficulties experienced with shop pans have been overcome by the provision of open baskets, preferably of wire, that are designed so that they provide individual support for the machine parts, are comparatively light in weight, and have runners and handles constructed and arranged in such a way relative to each other that the baskets may be safely stacked and easily and safely handled and moved about either individually or in stacked relation. Moreover, the construction of the wire baskets is such that the machine parts may remain in the baskets during degreasing and washing operations, consequently the additional handling of the machine parts and other equipment that was necessary when they were placed in the shop pans has been eliminated.

Thus, one of the essential objects of the present invention is to provide a basket structure that will minimize or prevent the marring of machine parts or other articles during the various stages of manufacture from the initial operation thereon to the final inspection thereof.

Another object is to provide a basket structure having a runner and handle structure that enables the baskets to be snugly and safely stacked and moved about in stacked relation.

Another object is to provide a basket structure that has full loading or carrying space at all times so that the area and depth of the baskets when stacked will be unimpaired.

Another object is to provide a basket structure capable of carrying heavy loads in individual or stacked relation.

Another object is to provide a basket assembly wherein the respective baskets thereof may be alike for carrying similar loads or may be individually different in construction for carrying different loads, but may be stacked as aforesaid regardless of the type of load carried thereby.

Another object is to provide a basket assembly that occupies a minimum of space on a floor of a shop or factory.

Another object is to provide a basket structure that enables the machine parts or other articles carried thereby to remain in loaded position during the degreasing or washing operations.

Another object is to provide a basket assembly wherein lateral or endwise displacement of the baskets relative to each other when stacked is effectively prevented. Actually the baskets are interlocked without interference with the loading or carrying space thereof when they are stacked.

Another object is to provide a basket assembly that is simple in construction, strong and durable, inexpensive to manufacture, easy to handle and move about, and capable of carrying safely the machine parts or other articles either during or after the manufacture thereof.

Other objects, advantages and novel details of construction of this invention will be made more apparent as this description proceeds, especially when considered in connection with the accompanying drawings, wherein:

Figure 1 is a side elevation of a stacked assembly of baskets embodying my invention;

Figure 2 is an end view of the assembly illustrated in Figure 1;

Figure 3 is a vertical sectional view taken substantially on the line 3—3 of Figure 2;

Figure 4:
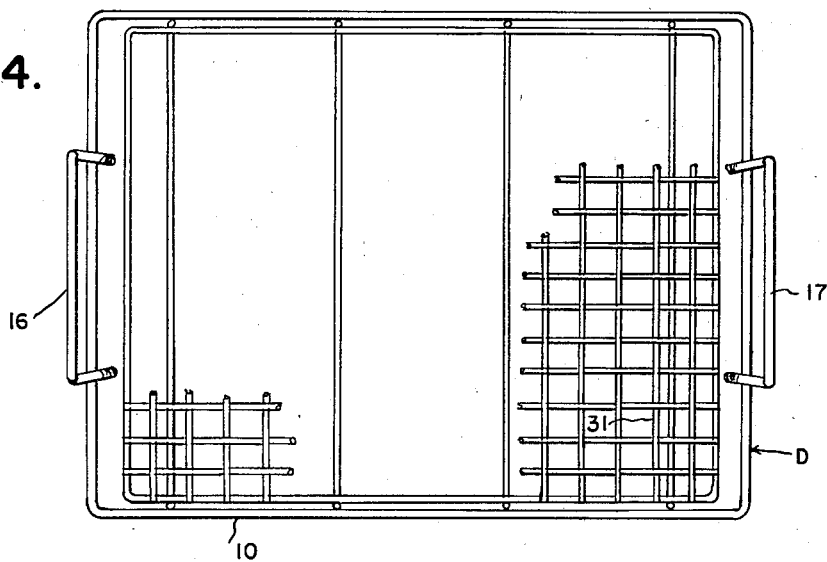
Figure 4 is a top plan view of one of the baskets with parts broken away and in section.

Referring now to the drawings, A, B, C and D, respectively, are baskets embodying my invention arranged in stacked relation. Preferably each of the baskets is formed entirely of wire and has a substantially rectangular frame 10 of the closed loop type, a pair of laterally spaced, longitudinally extending supporting runners 11 and 12, respectively, transversely extending, substantially U-shaped auxiliary supports 13 at longitudinally spaced points of the frame 10 and runners 11 and 12, article carrying means 14 mounted on the base portions 15 of the auxiliary supports, and transversely extending handles 16 and 17, respectively, at opposite ends of the frame 10.

In the present instance, the baskets A to D, inclusive, have the same area, although they may be equal or vary in depth. Likewise, the article carrying means 14 of the respective baskets may be the same or vary, as desired. For example, the lower two baskets A and B may be substantially the same depth but may be deeper than the upper two baskets C and D. Likewise, the article carrying means 14 of the lower two baskets may be different from the article carrying means 14 of the baskets C and D and may also be different from one another. The article carrying means 14 of the upper two baskets may be also different from one another. It should also be appreciated that more or less than four baskets of the type set forth herein may be arranged in stacked relation.

As shown, the frame 10 and auxiliary supports 13 of each basket are formed of medium gauge wire, while the runners 11 and 12 and handles 16 and 17 are formed of heavier gauge wire, and the article carrying means 14 is formed of lighter gauge wire. However any suitable gauge wire or its mechanical equivalent may be employed, as desired.

The frame 10 is at the upper ends of and is rigidly secured to the uprights 18 of the U-shaped supports 13. The bases 15 of these supports rest upon and are rigidly secured to the laterally spaced runners 11 and 12. Preferably the runners 11 and 12 extend the full length of the frame 10 and are provided at opposite ends thereof with upstanding extensions 19 and 20, respectively, that are rigidly secured to opposite ends of the frame and terminate above the latter in the handles 16 and 17.

To provide an efficient interlock with the runners 11 and 12 and extensions 19 and 20 of adjacent baskets when the latter are in stacked relation, the extensions 19 and 20 are provided between the frame 10 and handles 16 and 17 with inwardly projecting, outwardly opening, substantially V-shaped portions 21 and 22, respectively. However it is apparent that such portions may be any other suitable shape, such for example, U-shaped, and may be shallower or deeper in angularity or curvature, as desired. Preferably the upright extensions 19 and 20 diverge slightly upward from the runners 11 and 12 to the frame 10, as illustrated in Figure 2, while the V-shaped portions 21 and 22 of the extensions flare outward slightly, as illustrated in Figure 4, so that the lower end portions of the upright extensions 19 and 20 will fit snugly between the V-shaped portions 21 and 22, as illustrated in Figure 2 when the baskets are in stacked relation. Hence, relative lateral movement between stacked baskets is effectively prevented. It will also be noted that the runners 11 and 12 are adapted to rest upon the frames 10 of the next lower baskets when the latter are in stacked relation and that the handles 16 and 17 are adapted to engage the outer sides of the upright extensions 19 and 20 of the next upper baskets when in stacked relation. Hence relative endwise movement between the baskets is also prevented when they are in stacked relation.

The article carrying means 14 may vary, as desired. For example, the article carrying means 14 of the lower basket A may comprise longitudinally spaced, transversely extending rows of inverted U-shaped members 23 upon which tubular machine parts or other tubular articles (not shown) may be individually supported. Preferably the U-shaped members 23 extend downwardly between and are rigidly secured to spaced cross rods 24 and 25, respectively, that rest upon and are rigidly secured to laterally spaced, longitudinally extending rods 26 mounted on and rigidly secured to the bases 15 of the supports 13.

Figure 5:
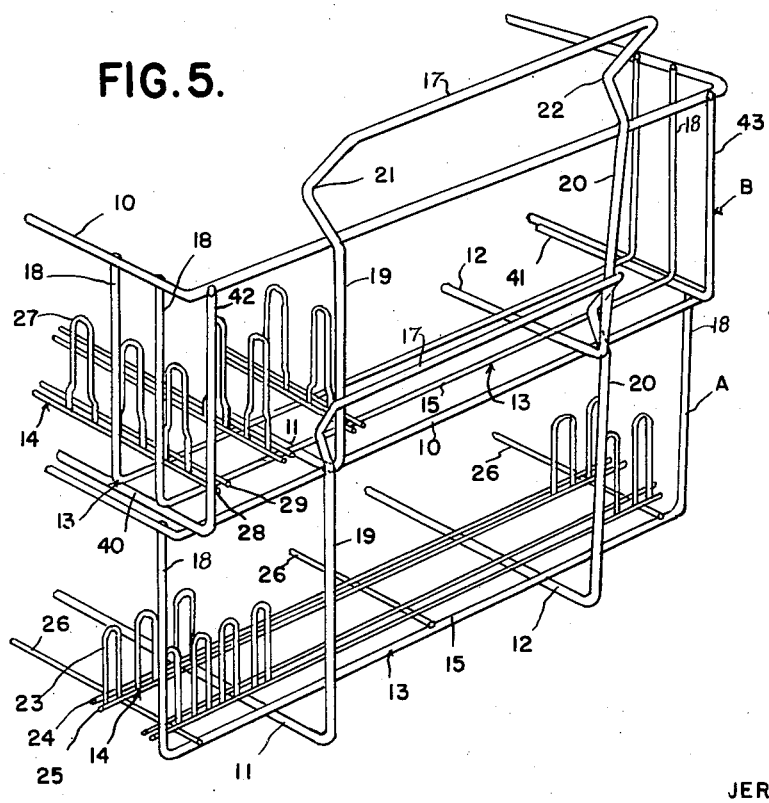
Figure 5 is a fragmentary perspective view of two of the baskets arranged in superposed relation.

The article carrying means 14 of the basket B next to the lower basket A may comprise laterally spaced, longitudinally extending rows of inverted U-shaped members 27 upon which other tubular machine parts or the like (not shown) may be supported. If desired, the arms of the inverted U-shaped members 27 may be outwardly offset relative to each other, as illustrated in Figure 5, and may extend downwardly between and be rigidly secured to longitudinally extending rods 28 and 29 resting upon and rigidly secured to the bases 15 of the supports 13.

The article carrying means 14 of the next upper basket C may be designed to carry headed or flanged machine parts and therefore comprises a latticework 30 of crossed wires providing openings therebetween through which the stems of such headed or flanged parts (not shown) may be inserted to extend downwardly in the basket. Such latticework 30 is preferably secured to the uprights 18 of the supports 13 adjacent the frame 10 but may be located at a lower point depending upon the length of the stems mentioned.

The article carrying means 14 of the uppermost basket D may be designed to carry relatively short machine parts (not shown) and for this purpose may comprise upper and lower latticework 31 and 32, respectively, of crossed wires having the openings of the latticework offset relative to each other so that the machine parts may be inserted downwardly through the openings in the upper latticework 31 to rest upon the crossed wires of the lower latticework 32. Both upper and lower latticework 31 and 32 are secured to the uprights 18 of the supports 13.

If desired, more than two runners such as 11 and 12 may be provided for any of the baskets to obtain a better distribution of the load. For example, the basket B next to the lowermost basket A is provided adjacent opposite sides thereof with auxiliary runners 40 and 41, but the upward extensions 42 and 43 thereof terminate at and are secured to the frame 10. Only the extensions 19 and 20 of the two runners 11 and 12 adjacent the center of a basket extend above the frame 10 thereof and terminate in handles such as 16 and 17, respectively.

Figure 6:
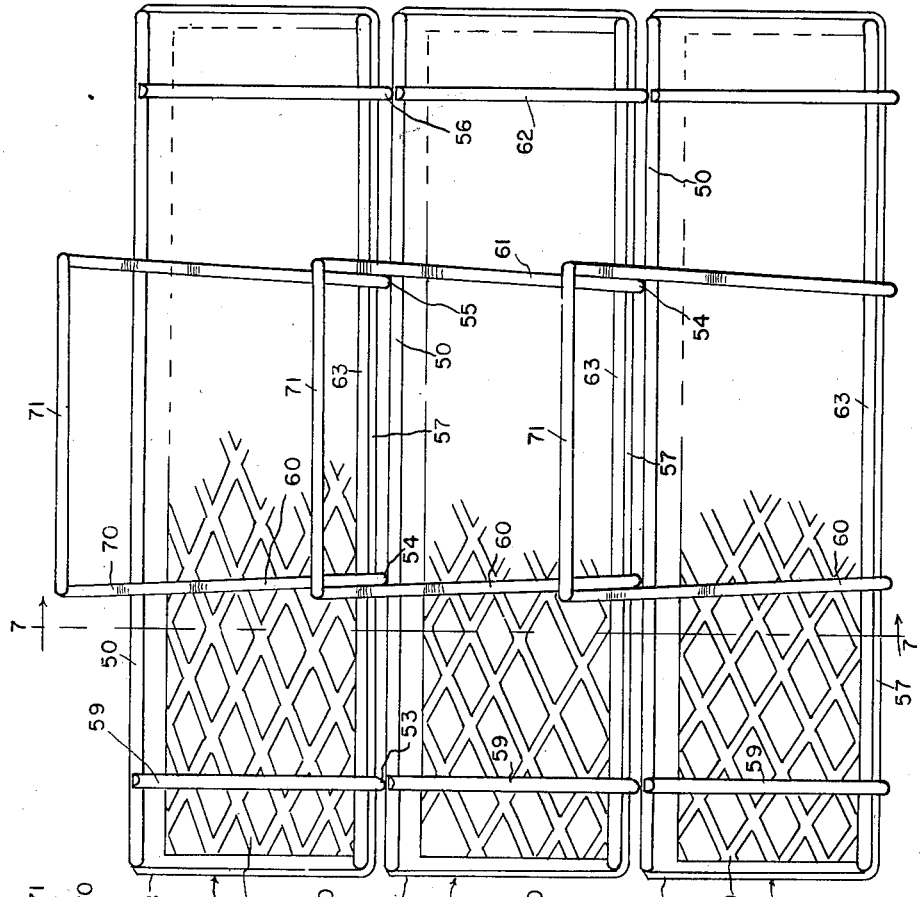
Figure 6 is an end elevational view of a slight modification.
Figure 7:
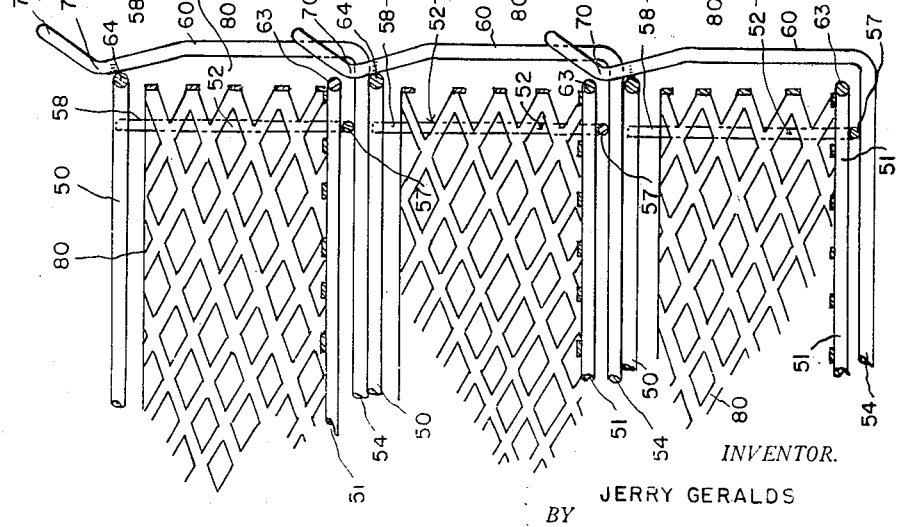
Figure 7 is a sectional view taken substantially on the line 7—7 of Figure 6.

In Figures 6 and 7 I have illustrated a slight modification wherein the baskets have upper and lower frames 50 and 51, respectively, of the closed loop type connected together by U shaped supports 52 that rest upon and are rigid with four runners 53 to 56, inclusive. As shown, the bases 57 of the U shaped supports are on the underside of and are rigid with the lower frame 51 and upon the upper side and rigid with the runners 53 to 56, inclusive, while the upright portions 58 of said supports extend to and are rigid with the outer sides of the upper frame 50. The runners 53 to 56, inclusive, project beyond opposite ends of the lower frame 51 and have upright extensions 59 to 62, inclusive, spaced outward from and free of the ends 63 of the lower frame but in contact and rigid with the outer sides of opposite ends 64 of the upper frame 50. The two outer extensions 59 and 62, respectively, at opposite ends of the baskets terminate at the upper frame 50, but the two intermediate extensions 60 and 61, respectively, at opposite ends of the baskets have outwardly opening substantially V shaped portions 70 that project upwardly above the upper frame 50 and terminate in transversely extending handles 71.

Thus, when the baskets are stacked as illustrated in Figure 7, the ends 64 and 63, respectively, of the upper and lower frames 50 and 51 of the respective baskets are substantially in vertical alignment upon the inner sides and clear of the V shaped portions 70 and handles 71. In other words, the runners 53 to 56, inclusive, project beyond the ends 63 of the lower frame 51 so that the upright extensions 59 to 62 are spaced outwardly from said ends 63, and the V shaped portions 70 are outside the area bounded by the upper frame 50 instead of projecting inside the same as in Figure 3. Thus, when the baskets are stacked, the ends 63 of the lower frame 51 of an upper basket may pass freely downward upon the inner sides of the V shaped portions 70 at the ends 64 of the upper frame 50 of a lower basket, as in Figure 7, consequently the runners 53 to 56, inclusive, of the upper basket may rest and distribute the load of the upper basket upon the upper frame 50 of the lower basket. Moreover, this construction makes is possible to use satisfactorily removable expanded metal trays 80 in the baskets which carry articles of various kinds. Preferably such trays 80 rest upon the lower frame 51 but terminate below the upper frames 50 of the baskets and are partitioned for supporting individually the articles to be carried. The partitions of the trays are also expanded metal and are rigidly secured together and to the upright sides and ends of the tray, hence a very rigid and strong structure is provided.

Thus, from the foregoing, it will be apparent that I have provided an efficient basket structure capable of carrying heavy loads and capable of being stacked safely for movement about a plant or factory, as desired. When four runners are used as described the load of an upper basket is distributed better upon the upper frame of a lower basket than when only two runners are used. However, regardless of the number of runners, the interlock at opposite ends of the baskets between the runners, extensions and handles of adjacent baskets effectively prevents lateral and longitudinal relative movement or displacement so that such baskets in stacked relation may be safely moved about.

What I claim as my invention is:

1. A basket structure having an elongated frame of the closed loop type, and laterally spaced longitudinally extending supporting runners beneath said frame and having upward extensions secured to opposite ends of said frame, said extensions projecting upwardly beyond said frame and terminating in connecting transversely extending handles, the portions of said extensions between the runners and frame diverging upward, and the portions of said extensions between the frame and handles being substantially V shape extending inward and diverging outward for overlapping interlocking engagement with the first mentioned portions of a superposed basket.

2. A basket structure having an elongated frame of the closed loop type, and laterally spaced longitudinally extending supporting runners beneath said frame and having upward extensions secured to opposite ends of said frame, said extensions projecting upwardly beyond said frame and terminating in transversely extending handles for engagement with the outer sides of runner extensions of a superposed basket, the portions of said extensions between the runners and frame diverging upward, and the portions of said extensions between the frame and handles having inwardly projecting outwardly opening substantially V-shaped parts for interlocking engagement with the runner extensions of a superposed basket.

3. An assembly of baskets comprising two baskets arranged one on top of the other, each basket having an elongated frame of the closed loop type, and laterally spaced longitudinally extending supporting runners beneath said frame and having upward extensions secured to opposite ends of said frame, said extensions projecting upwardly beyond said frame and terminating in connecting handles, the portions of said extensions between the runners and frame diverging upward, the portions of said extensions between the frame and handles having inwardly projecting outwardly diverging parts, the frame of the lower basket forming a supporting seat for the runners of the upper basket, the portions of the runner extensions between the runners and frame of the upper basket being between and interlocked with the outwardly diverging parts of the runner extensions of the lower basket and being upon the inner sides of and interlocked with the handles of the lower basket whereby relative lateral and endwise movement between said baskets is prevented.

4. An assembly of baskets comprising two baskets formed entirely of wire and arranged one on top of the other, each basket having an elongated frame of the closed loop type, and substantially parallel supporting runners beneath said frame and having upward extensions secured to opposite ends of said frame, said extensions projecting upwardly beyond said frame and terminating in transversely extending handles, the portions of said extensions between the runners and frame and handles diverging upward, the portions of said extensions between the frame and handles having outwardly diverging parts, the frame of the lower basket forming a supporting seat for the runners of the upper basket, the portions of the runner extensions between the runners and frame of the upper basket being between and interlocked with the outwardly diverging parts of the runner extensions of the lower basket and being upon the inner sides of and interlocked with the handles of the lower basket whereby relative lateral and endwise movement between said baskets is prevented.

5. A basket structure having upper and lower frames of the closed loop type a latticework bottom extending across and secured to said lower frame runners for said structure located beneath the lower frame and having upward extensions spaced outward from and free of the lower frame, said extensions projecting upwardly beyond said upper frame and terminating in connecting transversely extending handles, the portions of said extensions between the runners and frame diverging upward, and the portions of said extensions between the upper frame and handles extending inward and diverging outward for overlapping interlocking engagement with the first mentioned portions of a superposed basket, and U shaped supports for said frames having the bases of the U's between and rigid with said lower frame and runners and having the upwardly extending arms of the U's rigid with the upper frame the structure being adapted to nest with a similarly formed basket.

6. A basket structure having upper and lower frames of the closed loop type a latticework bottom extending across and secured to said lower frame runners for said structure spaced below the lower frame and having upward extensions spaced outward from and free of the lower frame and secured to the outer sides of the upper frame, two of said upward extensions projecting above the upper frame and terminating in transversely extending handles, U shaped supports for said frames having the bases of the U's between and rigid with said lower frame and runners and having the upwardly extending arms of the U's rigid with the upper frame, said extensions diverging upwardly from said runners to said handles to permit the runners of a superposed basket to rest on said frame between said extensions and inside of said handles, thereby preventing relative lateral and endwise movement between said baskets.

7. A basket structure comprising superposed baskets, each having a pair of laterally spaced longitudinally extending runners provided with upstanding extensions terminating at their upper ends in transversely extending handles, substantially U-shaped supports crossing and having the bases of the U's secured to said runners at spaced points longitudinally thereof, a frame of the closed loop type fixed to the upstanding arms of the U-shaped supports adjacent the upper ends thereof, and article carrying means connected to said supports, the handles of the lowermost basket crossing the outer sides of the upstanding extensions of the next upper basket and preventing relative longitudinal movement between the baskets, and the upward extensions of the lowermost basket having inwardly extending substanially V-shaped portions upon the outer sides of the upward extensions of the next upper basket and preventing relative lateral movement between the baskets.

8. A basket structure comprising superposed baskets, each having a pair of laterally spaced longitudinally extending runners provided with upstanding extensions terminating at their upper ends in transversely extending handles, substantially U-shaped supports crossing and having the bases of the U's secured to said runners at spaced points longitudinally thereof, a frame of the closed loop type fixed to the upstanding arms of the U-shaped supports adjacent the upper ends thereof, and article carrying means connected to said supports, the handles of the lowermost basket crossing the outer sides of the upstanding extensions of the next upper basket when said runners of the upper basket rest on said frame of the lower basket thereby preventing relative longitudinal movement between the baskets.

9. A basket structure comprising superposed baskets, each having a pair of laterally spaced longitudinally extending runners provided with upstanding extensions terminating at their upper ends in transversely extending handles, substantially U-shaped supports crossing and having the bases of the U's secured to said runners at spaced points longitudinally thereof, a frame of the closed loop type fixed to the upstanding arms of the U-shaped supports adjacent the upper ends thereof, and article carrying means connected to said supports, the handles of the lowermost basket crossing the outer sides of the upstanding extensions of the next upper basket when said runners of the upper basket rest on said frame of the lower basket thereby preventing relative longitudinal movement between the baskets, and the upward extensions of the lowermost basket having means upon the outer sides of the upward extensions of the next upper basket for preventing relative lateral movement between the baskets.

10. A basket structure comprising superposed baskets, each having a pair of laterally spaced longitudinally extending runners provided with upstanding extensions terminating at their upper ends in transversely extending handles, substantially U-shaped supports for article carrying means crossing and having the bases of the U's secured to said runners at spaced points longitudinally thereof, and a frame of the closed loop type fixed to the upstanding arms of the U-shaped supports adjacent the upper ends thereof, the handles of the lowermost basket crossing the outer sides of the upstanding extensions of the next upper basket when said runners of the upper basket rest on said frame of the lower basket thereby preventing relative longitudinal movement between the baskets.

11. A basket structure comprising superposed baskets, each having a pair of laterally spaced longitudinally extending runners provided with upstanding extensions terminating at their upper ends in transversely extending handles, substantially U-shaped supports for article carrying means crossing and having the bases of the U's secured to said runners at spaced points longitudinally thereof, and a frame of the closed loop type fixed to the upstanding arms of the U-shaped supports adjacent the upper ends thereof, the upward extensions of the lowermost basket having inwardly extending substantially V-shaped portions upon the outer sides of the upward extensions of the next upper basket when said runners of the upper basket rest on said frame of the lower basket thereby preventing relative lateral movement between the baskets.

12. A basket structure comprising superposed baskets, each having a pair of laterally spaced longitudinally extending runners provided with upstanding extensions terminating at their upper ends in transversely extending handles, substantially U-shaped supports for article carrying means crossing and having the bases of the U's secured to said runners at spaced points longitudinally thereof, and a frame of the closed loop type fixed to the upstanding arms of the U-shaped supports adjacent the upper ends thereof, and the upward extensions of the lowermost basket having means upon the outer sides of the upward extensions of the next upper basket for preventing relative lateral movement between the baskets when said runners of the upper basket rest on said frame of the lower basket.

JERRY GERALDS.